United States Patent [19]

Moss et al.

[11] Patent Number: 5,605,353
[45] Date of Patent: Feb. 25, 1997

[54] VEHICLE CHASSIS WITH ENERGY MANAGEMENT

[75] Inventors: Stephen P. Moss, Troy; John C. Johnson, Warren; Dilip M. Bhalsod, Troy; Craig W. Stumpf, Lansing, all of Mich.

[73] Assignee: General Motors Corporation, Detroit, Mich.

[21] Appl. No.: 513,161

[22] Filed: Aug. 9, 1995

[51] Int. Cl.$^6$ ................................................ B62D 21/15
[52] U.S. Cl. .................... 280/784; 296/189; 188/376; 411/104; 411/112
[58] Field of Search ........................... 280/784, 781, 280/785; 180/232, 274; 296/189, 204; 188/376, 377, 371; 411/104, 112, 113, 111

[56] References Cited

U.S. PATENT DOCUMENTS

| | | | |
|---|---|---|---|
| 2,825,380 | 3/1958 | Reiner | 411/113 |
| 3,896,896 | 7/1975 | Saitoh | 280/784 |
| 3,981,530 | 9/1976 | Yamanaka et al. | 180/274 |
| 4,424,986 | 1/1984 | Mizuno et al. | 280/784 |
| 4,781,398 | 11/1988 | Uebelstadt et al. | 280/784 |
| 5,139,297 | 8/1992 | Carpenter et al. | 293/132 |
| 5,193,643 | 3/1993 | McIntyre | 411/112 |
| 5,251,932 | 10/1993 | Ide | 280/784 |
| 5,308,115 | 5/1994 | Ruehl et al. | 280/785 |
| 5,335,745 | 8/1994 | Goor | 180/232 |
| 5,346,275 | 9/1994 | Enning et al. | 296/195 |
| 5,454,453 | 10/1995 | Meyer et al. | 280/784 |

FOREIGN PATENT DOCUMENTS

| | | | |
|---|---|---|---|
| 2255963 | 5/1974 | Germany | 180/232 |
| 2455790 | 6/1976 | Germany | 180/232 |
| 3301708 | 8/1984 | Germany | 180/232 |
| 5310145 | 11/1993 | Japan | 280/781 |

Primary Examiner—Brian L. Johnson
Assistant Examiner—Peter C. English
Attorney, Agent, or Firm—Charles E. Leahy

[57] ABSTRACT

According to the invention, a vehicle chassis includes first and second longitudinal extending side rails which are laterally spaced apart. A cross member extends transversely between the first and second side rails and has bolt holes therein. A longitudinally extending slotted aperture is provided in each side rail and registers with the bolt holes of the cross member. Each of the side rails has a cage member attached thereto and overlying aligned the slotted aperture. Each cage member has a longitudinally extending slotted aperture registering with the slotted aperture of the side rail and each has a nut captured therein for longitudinal movement of the nut within the cage member along the slotted aperture. A bolt is installed through the cross member bolt hole, through the slotted aperture of the side rail, and into the nut to attach the cross member and the side rail. Impact force applied against the cross member induces forced longitudinal movement of the cross member relative to the side rail as permitted by longitudinal movement of the bolt along the slotted aperture. At least one of the slotted apertures is constricted by a metal web or other constriction which normally blocks longitudinal movement of the bolt and then yields so that the relative longitudinal movement of the bolt causes yielding of the metal to absorb energy.

5 Claims, 3 Drawing Sheets (5,605,353)

VEHICLE CHASSIS WITH ENERGY MANAGEMENT

The invention relates to a vehicle chassis and more particularly to a chassis cross member attached to chassis side rails by a yielding connection.

BACKGROUND OF THE INVENTION

It is well known in motor vehicles to mount a vehicle body on a vehicle chassis. The chassis typically comprises laterally spaced apart side rails which support the engine and the front suspension. The side rails are suitably attached to the vehicle body which defines the occupant compartment. In order to strengthen and stiffen the side rails, it is known to provide a chassis cross member which extends transversely across the vehicle between the first and second side rails at a location rearwardly of the engine.

The present invention provides a new and improved vehicle chassis having a yieldable connection between the cross member and the side rails so that rearward movement of the cross member is accommodated during a circumstance of vehicle crush.

SUMMARY OF THE INVENTION

According to the invention, a vehicle chassis includes first and second longitudinal extending side rails which are laterally spaced apart. A cross member extends transversely between the first and second side rails and has bolt holes therein. A longitudinally extending slotted aperture is provided in each side rail and registers with the bolt holes of the cross member. Each of the side rails has a cage member attached thereto and overlying aligned the slotted aperture. Each cage member has a longitudinally extending slotted aperture registering with the slotted aperture of the side rail and each has a nut captured therein for longitudinal movement of the nut within the cage member along the slotted aperture. A bolt is installed through the cross member bolt hole, through the slotted aperture of the side rail, and into the nut, thereby reliably clamping together the cross member and the side rail. Impact force applied against the cross member induces forced longitudinal movement of the cross member relative to the side rail as permitted by longitudinal movement of the bolt along the slotted aperture. The slotted aperture has a constricted portion thereof which normally blocks longitudinal movement of the bolt but yields under impact load to permit the relative longitudinal movement of the bolt along the slot and thereby facilitate an orderly crush of the body and the chassis to absorb impact energy.

In particular, the slotted aperture may be provided in either the side rail or the cage and may be comprised of a round aperture portion which closely receives the bolt and an adjacent slotted portion separated from the round aperture by a web of metal which is forcibly fractured upon movement of the bolt along the slotted aperture. In a preferred embodiment, slotted apertures are provided in both the side rail and the cage member, and each has a bolt receiving aperture and an adjacent slotted portion which are separated by a frangible web of metal.

BRIEF DESCRIPTION OF THE DRAWINGS

These and other features, objects and advantages of the invention will become apparent upon consideration of the specification and the appended drawings in which.

DESCRIPTION OF THE PREFERRED EMBODIMENT

Figure 1:
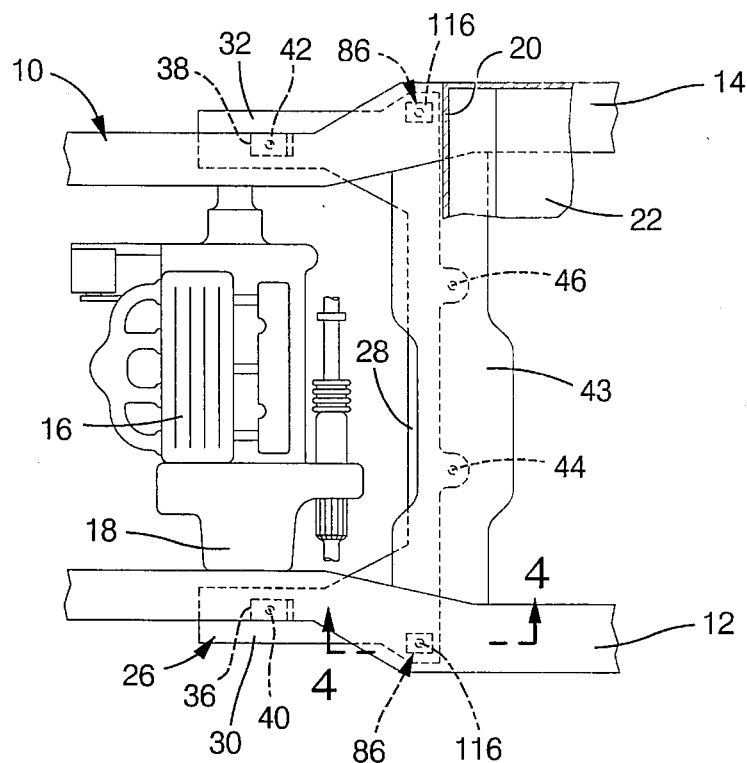
FIG. 1 is a plan view of a vehicle chassis according to the invention.
Figure 2:
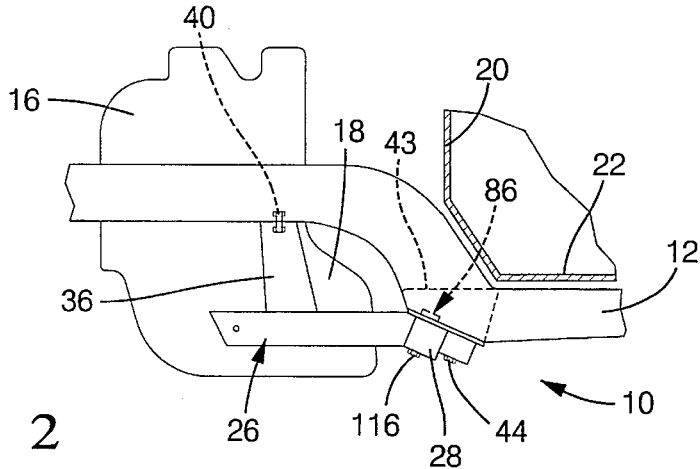
FIG. 2 is a side elevation view of the vehicle chassis according to the invention.

Referring to FIG. 1, there is shown a motor vehicle chassis 10 including a pair of laterally spaced apart side rails 12 and 14. An engine compartment is defined between the side rails 12 and 14 and is occupied by an engine 16 and transmission 18. As best seen in FIG. 2, the vehicle body includes a bulkhead 20 and a floor pan 22 which are suitably mounted on the side rails 12 and 14 by body mounts, not shown. A chassis cross member assembly, generally indicated at 26, is provided to stiffen and reinforce the side rails 12 and 14.

As seen in FIGS. 1 and 2, the cross member assembly is a general U-shaped stamping including a cross piece 28 and integrally formed legs 30 and 32. The cross member assembly 26 also includes a pair of vertical stanchions 36 and 38 which are welded respectively to the legs 30 and 32 and project upwardly therefrom. These stanchions 36 and 38 are respectively bolted to the side rails 12 and 14 by nut and bolt assemblies 40 and 42. As best seen in FIG. 1, the central portion of the cross member cross piece 28 is attached to a sheet metal reinforcement panel 43 by nut and bolt assemblies 44 and 46.

Figure 4:
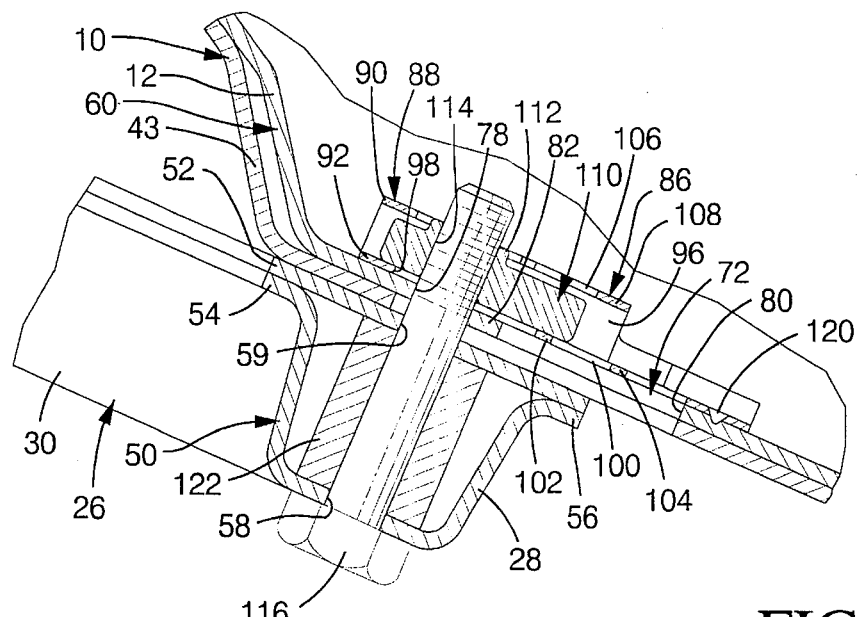
FIG. 4 is a section view taken in the direction of arrows 4—4 of FIG. 1 showing the bolt extending through the cross member and side rail into the caged nut.
Figure 7:
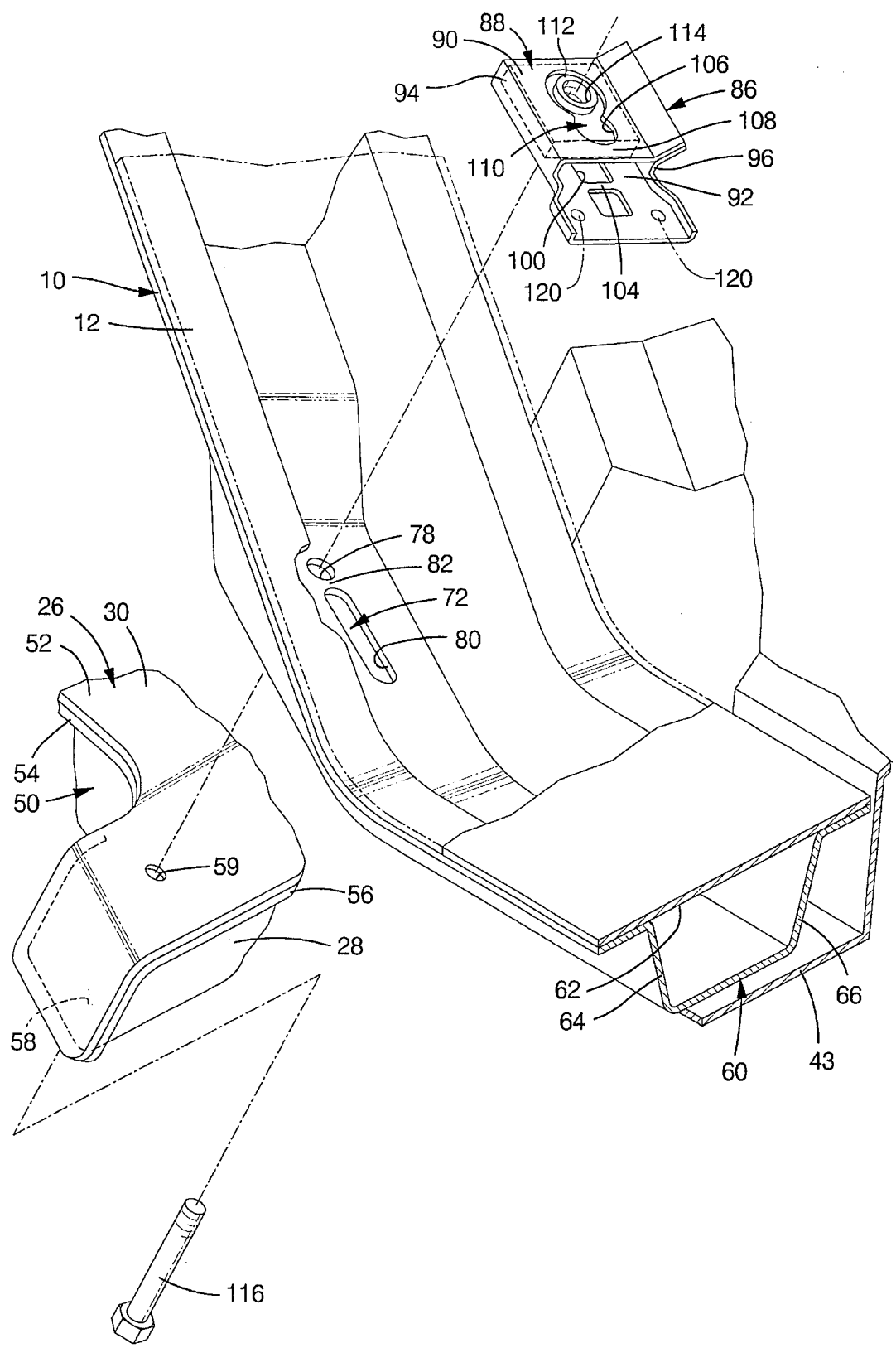
FIG. 7 is an exploded perspective view of the invention.

The cross member cross piece 28 is also bolted to the side rails 12 and 14. In particular, as seen in FIGS. 4 and 7, the cross member assembly 26 is defined by a lower stamping 50 of U-shaped cross section and a top plate 52 which is welded to flanges 54 and 56 of the lower stamping 50. As seen in FIG. 4, bolt holes 58 and 59 are provided through the lower stamping 50 and top plate 52 of the cross member cross piece 28.

Figure 6:
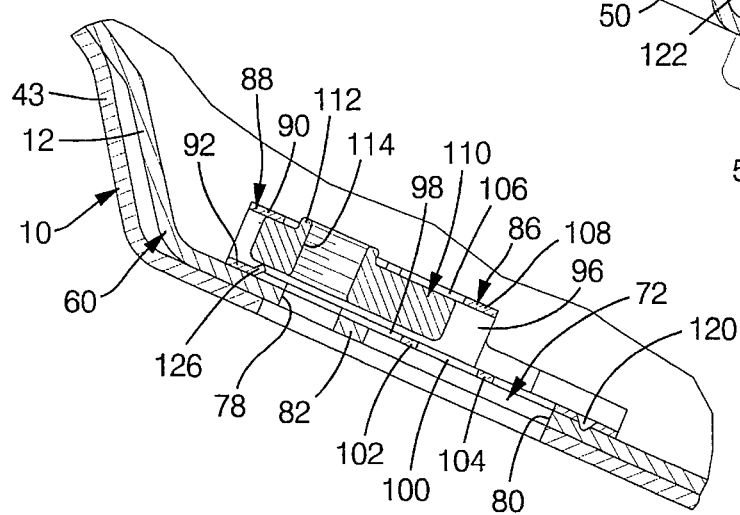
FIG. 6 is a section view similar to FIG. 4 but showing the condition of the cage nut prior to the installation of the bolt.

As best seen in FIG. 7, the side rail 12 is comprised of a U-shaped lower stamping 60 and a top plate 62 which is welded to legs 64 and 66 of the lower stamping 60. A reinforcement panel 43 underlies the lower stamping 60 and is suitably welded thereto. As best seen in FIGS. 6 and 7, the lower stamping 60 has a longitudinally extending slotted aperture 72 provided respectively therein. In particular, the slotted aperture includes a round bolt hole portion 78 which is aligned with the bolt hole 58,59 in the cross member assembly 26 and a longitudinal extending slot portion 80 which is separated from the hole 78 by a web of metal 82. The reinforcement 43 is provided with a suitable oversize clearance aperture which leaves the slotted aperture 72 of the side rail 12 open when viewed from the underside.

As best seen in FIGS. 4 and 7, a cage nut assembly 86 includes a box-shaped cage housing 88 having an upper wall 90, lower wall 92 and spaced apart side walls 94 and 96. The lower wall 92 has an aperture 98 which registers with the bolt holes 58,59 of cross member 26 and the bolt hole 78 of the side rail 12. Adjacent to and extending rearwardly from the bolt hole 98 is a longitudinal extending slot portion 100 which has webs 102 and 104 extending there across. The top wall of the housing has a key-hole shaped aperture 106, as best seen in FIG. 7. A web of metal at 108 defines the rearward most end of the key-hole shaped aperture 106.

The cage nut assembly 86 includes a cage nut 110 which is captured within the cage housing 88 and has a raised boss portion 112 which projects upwardly through the key-hole aperture 106 as best shown in FIG. 7. The nut has a central threaded aperture 114 for receiving a bolt 116. The cage nut assembly 86 is welded within the side rail 12 via spot welds at 120.

Referring to FIG. 6, the cage nut assembly 86 is shown prior in time to the installation of the bolt 116. As seen in FIG. 6, the lower wall 92 of the cage housing 88 has a tang 126 which is struck upwardly therefrom at the edge of bolt hole 98. As seen in FIG. 6, this tang 126 bears upon the underside of the cage nut 110 to elevate the cage nut 110 above the lower wall 92 of the cage housing 88. Accordingly, when the side rail 12 is dipped into a tank of rust preventative paint, the rust preventative paint may flow between the cage nut 110 and the cage housing 88. Furthermore, when the side rail 12 is lifted out of the tank, the paint may drain out of the space between the cage nut 110 and the cage housing 88 so that the cage nut 110 remains loosely captured and readily movable within the cage housing 88.

FIG. 4 shows the bolt 116 having been installed to attach the chassis cross member assembly 26 to the side rail 12. The tightening of the bolt 116 has caused the cage nut 110 to be drawn down tightly against the cage lower wall 92 of the cage housing 88 so that the tang 126 is bent flat against the lower wall 92. The bolt 116 is installed through a spacer sleeve 122 and is tightened with sufficient torque to tightly clamp and retain the chassis cross member 26 to the frame rail 12.

Figure 3:
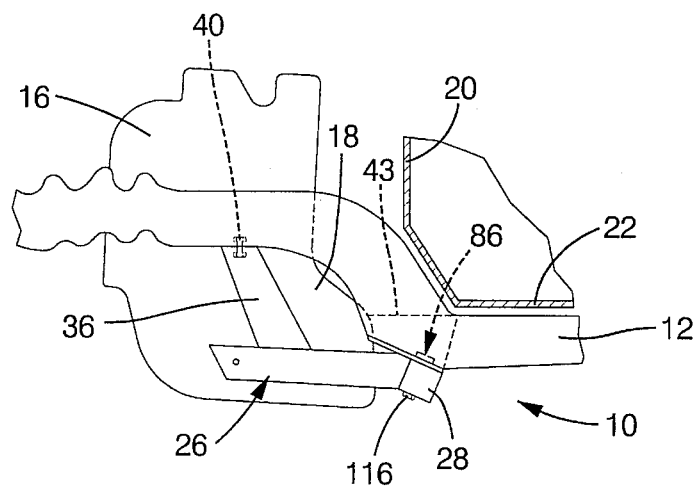
FIG. 3 is a view similar to FIG. 2 but showing the chassis cross member having been translated rearwardly by an impact condition.
Figure 5:
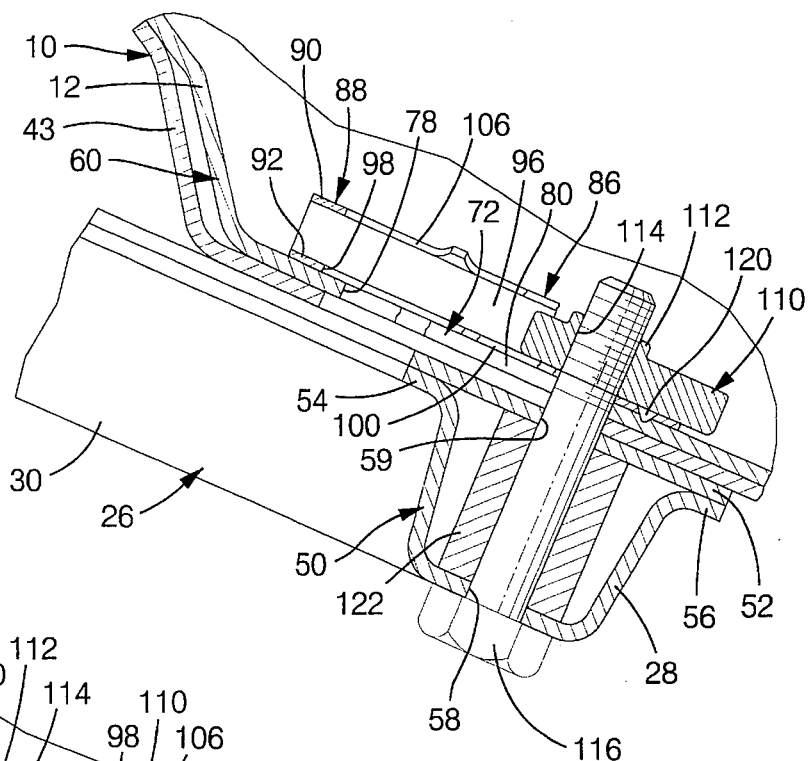
FIG. 5 is a view similar to FIG. 4 but showing the cross member having been displaced rearwardly relative to the side rails.

Referring to FIG. 3, there is a schematic representation of the vehicle crush which may occur during an accident situation. As seen in FIG. 3, the chassis member 26 is displaced rearwardly relative to the frame rail 12 as permitted by bending of the vertical stanchions 36 and 38 and the rearward displacement of the cross piece 28 relative to the frame rails 12 and 14. In particular, as seen by comparing FIGS. 4 and 5, the rearward displacement of the lower stamping 50 and top plate 52 of the chassis cross member assembly 26 causes the bolt 116 to be driven rightwardly from the position of FIG. 4 to the position of FIG. 5. This rightward movement of the bolt 116 is accommodated by the web 82 of the frame rail 12 being fractured and torn away and by the rightward sliding displacement of the cage nut 110 within the cage housing 88. It will be understood and appreciated that this displacement of the cage nut 110 is accommodated by the fracture or tearing away of the key hole slot 106 and web 108 of the top wall 90 of the cage housing 88. In addition, there is a breaking and tearing away of the webs 102 and 104 of the lower wall 92 of the cage housing. In addition, the successive tearing away of these webs serves to permit rearward displacement of the cross member relative the frame rails and facilitate an orderly crush of the body and chassis to absorb impact energy.

It will be understood and appreciated that in the case of the preferred embodiment shown in the drawings, the tear away webs are provided in each of the frame rail 12, cage housing upper wall 90 and cage housing lower wall 92. In each case, the presence of the web provides a constriction which diminishes the dimension of the slot to a dimension less than the diameter of the bolt 116 to thereby constrict the path of sliding movement of the bolt. However, it will be appreciated that it may be desirable to omit the provision of such a constriction in all of these slots and instead modify the number of webs provided, and/or the thickness of the metal to be torn away. Furthermore, it will be appreciated that the constriction of movement may be provided by configuring the slotted apertures in the shape of a key hole slot like that of key hole shaped aperture 106, as shown in FIG. 7, as opposed to the provision of break away webs which extend the full distance across the width of the slotted apertures.

We claim:

1. An energy managing vehicle chassis comprising:

first and second longitudinal extending chassis side rails spaced laterally apart;

a cross member extending transversely across the vehicle between the first and second side rails and having first and second bolt holes therein to enable attachment of the cross member to the side rails;

first and second longitudinal extending slotted apertures provided respectively in the side rails and registering respectively with the first and second bolt holes in the cross member;

first and second cage members attached respectively to the first and second side rails and aligned with the slotted apertures thereof, each cage member having a longitudinal extending slot registering with the aligned slotted aperture of the respective side rail and each cage member having a nut captured therein for longitudinal movement of the nut within the cage member along the respective slotted aperture; and first and second bolts extending respectively through the first and second cross member bolt holes, through the aligned slotted aperture of the respective side rail, and threaded into the nut captured by the respective cage member to attach the cross member and the side rails together and yet permit an impact force applied against the cross member to induce forced longitudinal movement of the cross member relative to the side rails, as permitted by longitudinal movement of the bolts along the slotted apertures;

at least one of the slotted apertures having a constriction thereof to impede relative longitudinal movement of the bolt along the at least one slotted aperture to absorb energy.

2. The combination of claim 1 further characterized by at least one of the slotted apertures comprising a round aperture to receive the respective bolt and an adjacent slotted portion separated from the round aperture by a web of metal which is forcibly fractured to enable movement of the respective bolt along the at least one slotted aperture.

3. The combination of claim 2 further characterized by a plurality of webs of metal extending across the slots of the cage members for successive fracture upon movement of the bolt along the slots.

4. The combination of claim 1 further characterized by the slotted apertures provided in the side rails and the slots provided in the cage members comprising an aperture to receive the respective bolt and an adjacent slotted portion separated from the aperture by a web of metal which is forcibly fractured to enable movement of the respective bolt along the respective slotted aperture and slot.

5. The combination of claim 1 further characterized by the first and second cage members each being a box-shaped member defined by spaced apart opposing walls and each respectively having a tab struck from at least one of the respective walls to space the respective nut away from the at least one wall.

* * * * *